US009261970B2

United States Patent
Hu

(10) Patent No.: US 9,261,970 B2
(45) Date of Patent: Feb. 16, 2016

(54) EXTENDED KEYBOARD, ELECTRONIC DEVICE, AND KEYBOARD EXTENDING SYSTEM

(71) Applicant: HON HAI PRECISION INDUSTRY CO., LTD., New Taipei (TW)

(72) Inventor: Po-Sung Hu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 231 days.

(21) Appl. No.: 13/954,956

(22) Filed: Jul. 30, 2013

(65) Prior Publication Data

US 2014/0138232 A1 May 22, 2014

(30) Foreign Application Priority Data

Nov. 22, 2012 (TW) .............................. 101143661 A

(51) Int. Cl.
*H03K 17/94* (2006.01)
*G06F 3/02* (2006.01)
*B41J 5/00* (2006.01)
*G06F 3/039* (2013.01)
*G06F 3/0488* (2013.01)

(52) U.S. Cl.
CPC .............. *G06F 3/0202* (2013.01); *G06F 3/039* (2013.01); *G06F 3/04886* (2013.01)

(58) Field of Classification Search
CPC ....... G06F 3/02; G06F 3/0202; G06F 3/0488; G06F 1/1626; H03M 11/00; G05G 9/047; H03K 17/9622; B41J 5/10
USPC ................ 345/169, 168, 173; 341/20, 22, 33; 400/485
See application file for complete search history.

(56) References Cited

U.S. PATENT DOCUMENTS

| 6,232,960 | B1 * | 5/2001 | Goldman ................ G06F 3/011 345/168 |
| 6,628,961 | B1 * | 9/2003 | Ho ........................ G06F 3/0219 345/168 |
| 2007/0013662 | A1 * | 1/2007 | Fauth ...................... G06F 3/016 345/168 |
| 2007/0152974 | A1 * | 7/2007 | Kim ........................ G06F 3/016 345/168 |
| 2008/0062138 | A1 * | 3/2008 | Im ....................... G06F 3/04886 345/173 |
| 2010/0207888 | A1 * | 8/2010 | Camiel ................. G06F 1/1616 345/168 |
| 2010/0238119 | A1 * | 9/2010 | Dubrovsky ........... G06F 1/1626 345/169 |
| 2010/0302168 | A1 * | 12/2010 | Giancarlo ............. G06F 3/0202 345/169 |
| 2011/0074686 | A1 * | 3/2011 | Causey ................. G06F 3/0238 345/168 |
| 2011/0267276 | A1 * | 11/2011 | Agata ................... G06F 1/1626 345/168 |
| 2014/0300551 | A1 * | 10/2014 | Purcocks .............. G06F 3/0202 345/168 |

\* cited by examiner

*Primary Examiner* — George Bugg
*Assistant Examiner* — Munear Akki
(74) *Attorney, Agent, or Firm* — Novak Druce Connolly Bove + Quigg LLP

(57) ABSTRACT

An extended keyboard includes keys and conductive contact points. Each key is connected to a corresponding one or more conductive contact points. The conductive contact points protrude from a backside of the extended keyboard. The conductive contact points are used to contact with a multi-point touch screen of an electronic device when the extended keyboard is placed on the multi-point touch screen of the electronic device, such that when an operation is applied to one key, the corresponding one or more conductive contact points electrically connected to the key conduct the operation to positions of the multi-point touch screen contacted with the corresponding conductive contact points.

19 Claims, 8 Drawing Sheets

| Conductive contact point | Key |
|---|---|
| C1 | 1 |
| C2 | 2 |
| C3 | 3 |
| C4 | 4 |
| C1+C2 | 5 |
| C1+C3 | 6 |
| C1+C4 | 7 |
| C2+C3 | 8 |
| C2+C4 | 9 |
| C3+C4 | 0 |
| C1+C2+C3 | Esc |
| C1+C2+C4 | Enter |
| C1+C3+C4 | Delete |
| C2+C3+C4 | Tab |
| C1+C2+C3+C4 | Space |

FIG. 5

EXTENDED KEYBOARD, ELECTRONIC DEVICE, AND KEYBOARD EXTENDING SYSTEM

BACKGROUND

1. Technical Field

The present disclosure relates to keyboards, and particularly to an extended keyboard applied to a multi-point touch screen device, an electronic device with the extended keyboard, and a keyboard extending system.

2. Description of Related Art

Electronic devices with touch screen often have a virtual keyboard on the touch screen for inputting text. However, when the virtual keyboard is displayed, a large area of the touch screen is covered by the virtual keyboard, which limits the usage of the touch screen. Many extended keyboards used for the electronic device with the touch screen need to connect to the electronic device via a universal serial bus (USB) port. However, the extended keyboard is complex and needs corresponding keyboard processing circuits and chips, which makes the extended keyboard expensive.

Therefore, an extended keyboard, an electronic device with the extended keyboard, and a keyboard extending system to overcome the described limitations are needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

FIG. 5 is a schematic diagram of an embodiment of a relationship table of keys and conductive contact points.

DETAILED DESCRIPTION

Embodiments of the present disclosure will be described with reference to the accompanying drawings.

Figure 1:
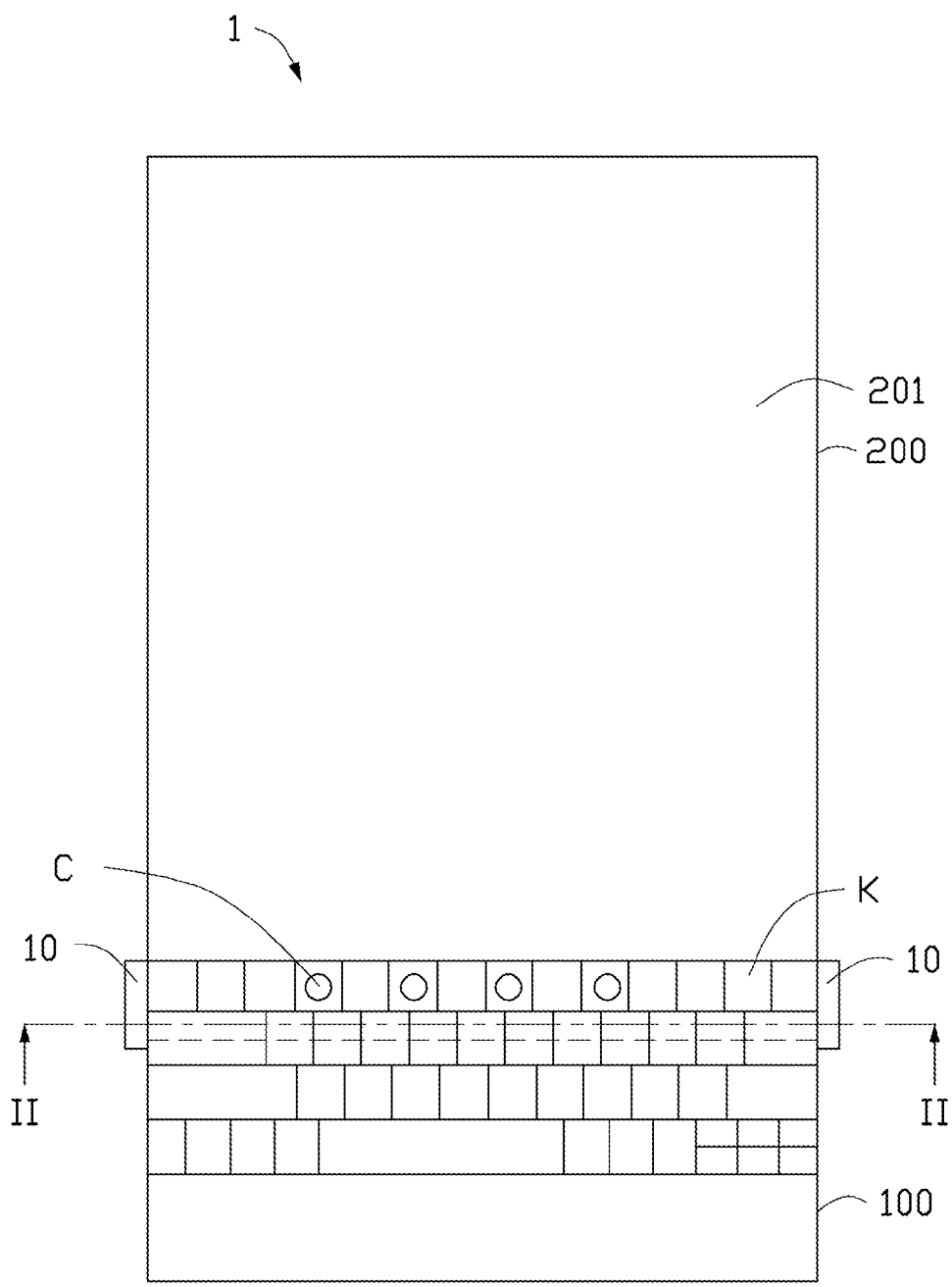
FIG. 1 is a schematic diagram of an embodiment of a keyboard extending system, with an extended keyboard and an electronic device contacted to each other.

FIG. 1 shows a keyboard extending system 1. The keyboard extending system 1 includes an extended keyboard 100 and an electronic device 200. The electronic device 200 includes a multi-point touch screen 201. In the embodiment, the multi-point touch screen 201 is a capacitive multi-point touch screen.

The extended keyboard 100 includes a number of keys K and a number of conductive contact points C. Each key K is connected to one or more corresponding conductive contact points C. The conductive contact points C protrude from a backside of the extended keyboard 100. When the extended keyboard 100 is placed on the multi-point touch screen 201, the conductive contact points C electrically contact the multi-point touch screen 201. The conductive contact points C can be made of metal, such as iron or copper, or can be made of indium tin oxide material and other conductive materials. In the embodiment, an upper row of keys of the extended keyboard 100 contacts the multi-point touch screen 201 to electrically connect the extended keyboard 100 to the electronic device 200. When the extended keyboard 100 is electrically connected to the electronic device 200, a width of an area of the extended keyboard 100 in contact with the multi-point touch screen 201 is approximately equal to a width of an upper row of keys of the extended keyboard 100, and the conductive contact points C are located below the upper row of keys of the extended keyboard 100.

The extended keyboard 100 also includes at least one fixing part 10. As shown in FIG. 1, the extended keyboard 100 includes two fixing parts 10, which fix the extended keyboard 100 to the electronic device 200.

Figure 2:
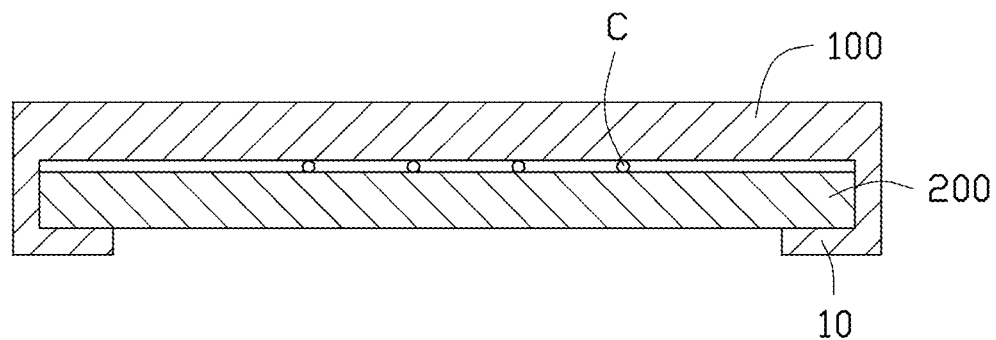
FIG. 2 is a cross-sectional view of a first embodiment of an extended keyboard putting on an electronic device of FIG. 1, taken along the line II thereof.

Referring to FIG. 2, in a first embodiment, the two fixing parts 10 are bent arms respectively extending from two sides of the extended keyboard 100.

Figure 3:
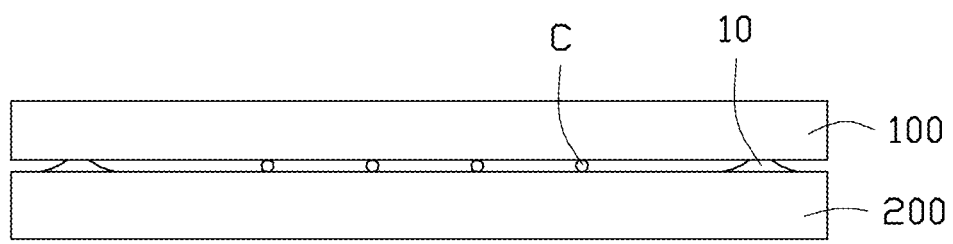
FIG. 3 is a cross-sectional view of a second embodiment of an extended keyboard putting on an electronic device of FIG. 1, taken along the line II thereof.

Referring to FIG. 3, in a second another embodiment, the two fixing parts 10 are both suction structures to adhere the multi-point touch screen 201 to the extended keyboard 100. In further another embodiment, the fixing parts 10 are made of magnetic material and adhere to a metal cover of the electronic device 200. A number of the fixing parts 10 may be adjusted according to the embodiment, or the fixing parts 10 may be omitted, such that the extended keyboard 100 is directly placed on the multi-point touch screen 201 unsecured.

Figure 4:
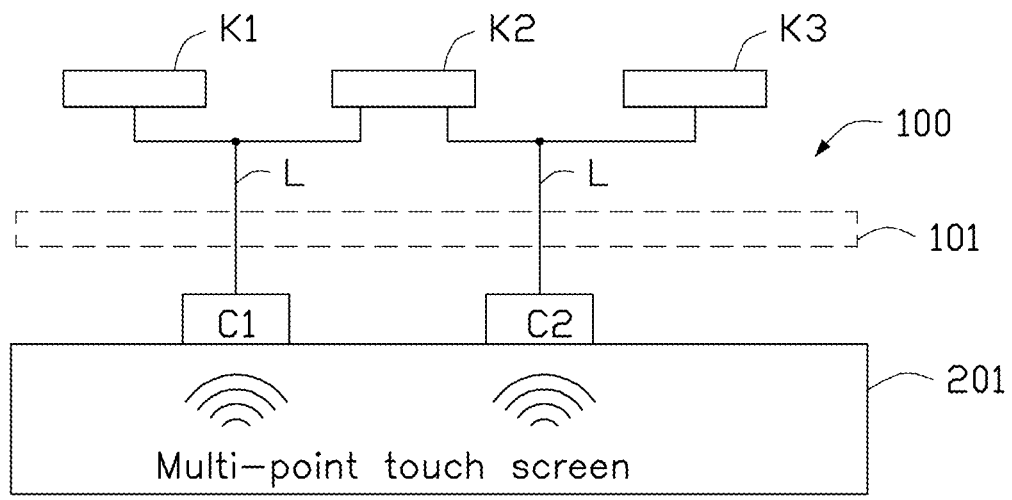
FIG. 4 is a partial schematic diagram of an extended keyboard contacting a multi-point touch screen.

Referring also to FIG. 4, the conductive contact points C are conductive contact points C1, C2, and so on. FIG. 4 only shows a part of the extended keyboard 100. The part of the extended keyboard 100 as shown in FIG. 4 includes two conductive contact points C1, C2, and three keys K1 to K3. Each key K is electrically connected to one or more conductive contact points C via at least one conductive line L. For example, as shown in FIG. 4, the key K1 is only connected to the conductive contact point C1, the key K2 is connected to both the conductive contact points C1 and C2, and the key K3 is only connected to the conductive contact point C2.

Referring also to FIG. 5, a relationship table defining relationships between the keys K and the conductive contact points C is illustrated. In the embodiment, the number of the conductive contact points C is four. The keys K includes numeric keys 0~9, an Esc key, an Enter key, a Space key, a Delete key, and a Tab key. As shown in FIG. 5, the numeric keys 1~4 respectively correspond and electrically connect to the conductive contact points C1~C4, and the numeric key 5 corresponds and electrically connects to the conductive contact points C1, C2, and the like.

The keys K are electrically connected to the multi-point touch screen 201, such that a user can type on the multi-point touch screen 201 via the keys K, the contact points C, and the conductive lines L. Because the multi-point touch screen 201 is electrically connected to the keys K via corresponding conductive contact points and conductive lines L, the positions of the multi-point touch screen 201 that are connected to the conductive contact points C are extended to the keys K.

For example, as shown in FIG. 4, when the user presses the key K1, because the key K1 is electrically connected to the conductive contact point C1, and the conductive contact point C1 is electrically connected to the multi-point touch screen 201, the user directly operates the position of the multi-point touch screen 201 electrically connected to the conductive contact point C1. Similarly, when the user presses the key K2, the user directly operates two positions of the multi-point touch screen 201 electrically connected to the conductive contact points C1, C2. The electronic device 200 determines which key K is pressed by the user according to the relationship between the key and the conductive contact points defined in the relationship table, and then executes a function corresponding to the key K.

In the embodiment, the amount of the conductive contact points C is determined by the amount of the keys K. For example, as shown in FIG. 5, different permutations and combinations of four conductive contact points C can correspond to fifteen keys, namely, $C_4^1+C_4^2+C_4^3+C_4^4=15$. Different permutations and combinations of five conductive contact points C can correspond to 31 keys, namely $C_5^1+C_5^2+C_5^3+C_5^4+C_5^5=31$. Therefore, the number of conductive contact points C is determined according to the number of keys K.

In the embodiment, as shown in FIG. 4, the extended keyboard 100 also includes an insulating layer 101. The insulating layer 101 is located between the keys K and the conductive contact points C to prevent the keys K from directly contacting the conductive contact points C. The conductive lines L pass through the insulating layer 101. Therefore, the keys K are only electrically connected to the corresponding contact points via the conductive lines L. Depending on the embodiment, the conductive lines L can be replaced by conductive vias or by conductive strips, for example.

Figure 6:
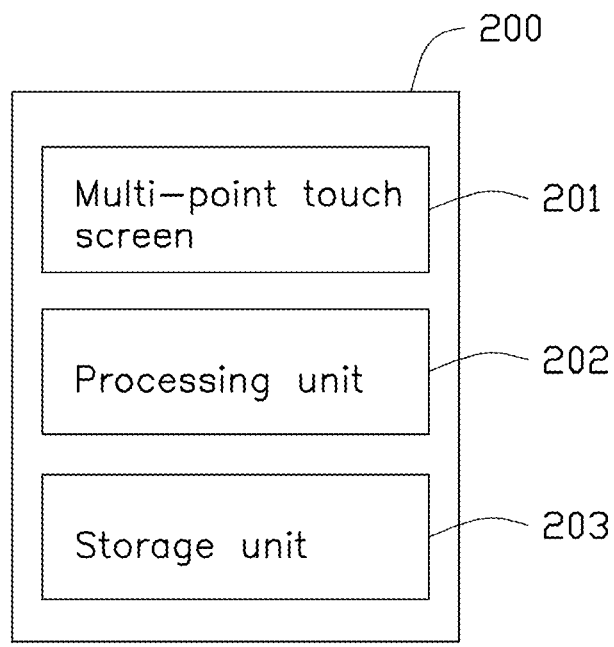
FIG. 6 is a block diagram of an embodiment of an electronic device.

Referring to FIG. 6, a block diagram of the electronic device 200 is illustrated. The electronic device 200 includes the multi-point touch screen 201, a processing unit 202, and a storage unit 203. The storage unit 203 stores the relationship table defining the relationships between the keys K and the conductive contact points C. The relationship table can be pre-stored in the storage unit 203 by a manufacturer, or be configured by the user according to different extended keyboards 100.

In the embodiment, a key K is connected to all of the conductive contact points C. That key K is defined as a relation key.

The processing unit 202 prompts the user to press the relation key when receiving an extension signal, and determines the positions of the multi-point touch screen 201 in contact with the conductive contact points C according to the touch signals received from the multi-point touch screen 201. The extension signal can be produced by a user via pressing a particular button or selecting a certain menu item, for example, after the extended keyboard 100 is fixed on the electronic device 200. When the user presses the relation key, the positions of the multi-point touch screen 201 in contact with the all of conductive contact points C produces the touch signals, the processing unit 202 determines the positions of the multi-point touch screen 201 according to the touch signals. The processing unit 202 then associates the contacted positions of the multi-point touch screen 201 with the conductive contact points C one by one. Namely, the processing unit 202 determines a relationship between the positions of the multi-point touch screen 201 and the conductive contact points C. In the embodiment, the extension signal can be produced by a user via pressing a particular button or selecting a certain menu item, after the extended keyboard 100 is fixed on the electronic device 200.

In the embodiment, the conductive contact points C of the extended keyboard 100 are arranged in one line, so the positions of the multi-point touch screen 201 are also arranged in one line. The processing unit 202 associates the determined positions on the multi-point touch screen with the conductive contact points C one by one. For example, if the conductive contact points C are arranged from left to right in sequence, the processing unit 202 associates the determined positions in contact with the contact points C one by one from left to right. The processing unit 202 then controls the electronic device 200 to enter into an extended keyboard mode when the processing unit completes associating the determined positions with the conductive contact points C.

In the extended keyboard mode, when one key K is pressed/touched by the user, the positions of the multi-point touch screen 201 contacting the corresponding conductive contact points C produce touch signals. The processing unit 202 determines the positions being touched of the multi-point touch screen 201 according to the touch signals and then determines the conductive contact points C according to the relationship between the positions of the multi-point touch screen 201 and the conductive contact points C. The processing unit 202 also determines the key K operated by the user according to the relationship table. The processing unit 202 then executes the function of the determined key K.

As described above, the extended keyboard 100 only covers a small area of the multi-point touch screen 201, corresponding to the upper row of keys. Therefore, the content displayed by the multi-point touch screen 201 is not influenced.

In the embodiment, the processing unit 202 also determines an extended keyboard area (not shown) on the multi-point touch screen when the processing unit 202 controls the electronic device 200 to enter into the extended keyboard mode. In the embodiment, the processing unit 202 determines an area surrounding the positions corresponding to all of the conductive contact points C as the extended keyboard area. In the embodiment, the size of the extended keyboard area is equal to the size of the area covered by the extended keyboard 100. The processing unit 202 also defines an area of the multi-point touch screen 201 outside of the extended keyboard area as a display area. The processing unit 202 adjusts display content, previously displayed on the whole multi-point touch screen 201, to only display on the defined display area. Thus, the display content can be viewed by the user without interference by the extended keyboard 100.

The extended keyboard 100 can be fixed on any side of the multi-point touch screen 201, such as a bottom side, a left side, or the like.

Figure 7A:
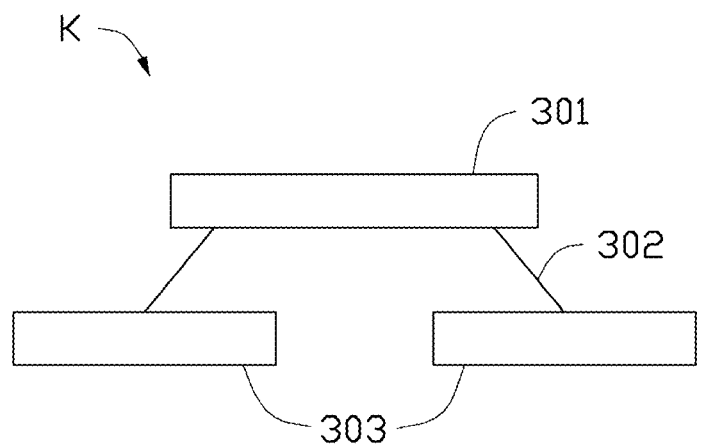
FIGS. 7A-7B are schematic diagrams showing a key of the extended keyboard in two different states of use.
Figure 7B:
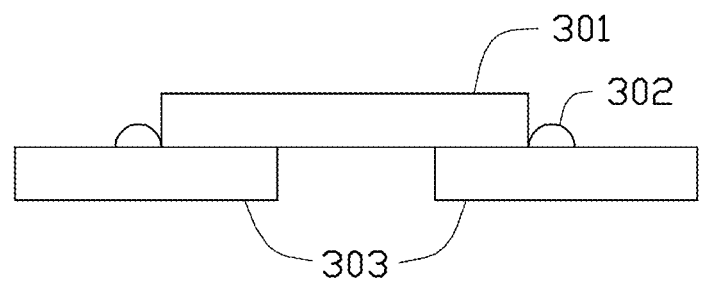

Referring to FIGS. 7A and 7B, a structure of one key K is illustrated. In the embodiment, the key K includes a conductive layer 301, a spacer layer 302, and a number of conductive pads 303. A number of the conductive pads 303 are equal to a number of conductive contact points C connected to the key K. The spacer layer 302 is located between the conductive layer 301 and the conductive pads 303. As shown in FIG. 7A, when the key K is not operated by the user, the spacer layer 302 separates the conductive layer 301 from the conductive pads 303. As shown in FIG. 7B, when the key K is operated by the user, the spacer layer 302 is deformed, such that the conductive layer 301 contacts the conductive pads 303. In another embodiment, the key K is a conductive block and connects to the corresponding conductive contact points C via the conductive lines L.

The electronic device 200 can be a mobile phone, a tablet computer, a notebook computer, a digital photo frame, or the like.

In the keyboard extending system 1 of the present invention, only a little area of the multi-point touch screen 201 is covered by the extended keyboard 100, such that the display of the electronic device 200 is not influenced. Additionally, the present extended keyboard 100 does not need to include keyboard processing circuits or chips, thereby decreasing a cost of production.

It is understood that the present embodiments and their advantages will be understood from the foregoing description, and various changes may be made thereto without departing from the spirit and scope of the disclosure or sacrificing all of its material advantages, the examples hereinbefore described merely being embodiments of the present disclosure.

What is claimed is:

1. An extended keyboard comprising:
a plurality of keys and a plurality of conductive contact points;
wherein, each key is electrically connected to at least two contact points of the conductive contact points, the conductive contact points protrude from the backside of the extended keyboard; the conductive contact points are configured to contact with different positions in a multi-point touch screen of an electronic device;
when a key is pressed by a user, the different positions in the multi-point touch screen is operated by the user through the at least two contact points connected to the key and the pressed key is detected by the electronic device according to the different positions being operated.

2. The extended keyboard according to claim 1, further comprising at least one fixing part configured to fix the extended keyboard to the electronic device.

3. The extended keyboard according to claim 2, wherein the at least one fixing part is a bent arm extending from a side of the extended keyboard, or has suction structure to adhere the extended keyboard to the electronic device.

4. The extended keyboard according to claim 1, wherein the plurality keys are conductive blocks and are respectively electrically connected to the corresponding conductive contact points via conductive lines.

5. The extended keyboard according to claim 4, further comprising an insulating layer located between the keys and the conductive contact points, wherein the keys are connected to the corresponding conductive contact points via conductive lines which are passed through the insulating layer.

6. The extended keyboard according to claim 1, wherein the key comprises a conductive layer, a spacer layer, and a plurality of conductive pads, a number of the conductive pads is equal to the number of the conductive contact points connected to the key, and the conductive pads are connected to the conductive contact points one by one, the spacer layer is located between the conductive layer and the conductive pads; when the key is operated by the user, the spacer layer is depressed and the conductive layer is contacted with the conductive pads.

7. The extended keyboard according to claim 1, wherein a width of an area of the extended keyboard contacting with the multi-point touch screen is approximately equal to a width of an upper row of keys of the extended keyboard, and the conductive contact points are located below the upper row of keys of the extended keyboard.

8. An electronic device comprising:
a multi-point touch screen configured to contact with a plurality of conductive contact points of an extended keyboard with a plurality of keys when the electronic device is needed to extend keyboard;
a storage unit configured to store a relationship table defining relationships between the keys and the conductive contact points; and
a processing unit, wherein the processing unit is configured to determine which conductive contact points that is operated by a user at the same time according to touch signals produced by the multi-point touch screen and determine the key operated by the user according to the relationship table defining relationships between the keys and the conductive contact points, then execute the function of the determined key.

9. The electronic device according to claim 8, wherein the processing unit is further configured to determine an area surrounding the positions corresponding to all of the conductive contact points as the extended keyboard area when the electronic device enters an extended keyboard mode; the processing unit is further configured to define an area of the multi-point touch screen excepting the extended keyboard area as a display area, and then adjust a display content previously displayed on the whole multi-point touch screen to only display on the defined display area.

10. The electronic device according to claim 8, wherein the electronic device is one selected from a group consist of a mobile phone, a tablet computer, a notebook computer, and a digital photo frame.

11. A keyboard extending system comprising:
an electronic device and an extended keyboard;
wherein, the electronic device comprises a multi-point touch screen, a storage unit, and a processing unit; the extended keyboard comprises a plurality of keys and a plurality of conductive contact points; each key is electrically connected to at least two contact points of the conductive contact points, the conductive contact points protrude from the backside of the extended keyboard; the conductive contact points are configured to contact with different positions in a multi-point touch screen of an electronic device;
wherein, the a storage unit stores a relationship table defining relationships between the keys and the conductive contact points;
wherein, the processing unit is configured to determine touch positions according to touch signals produced by the multi-point touch screen, and determine which conductive contact points that is operated by a user at the same time according to the touch positions in the multi-point touch screen and determine the key operated by the user according to the relationship table defining relationships between the keys and the conductive contact points, then execute the function of the determined key.

12. The keyboard extending system according to claim 11, wherein the extended keyboard further comprises at least one fixing part configured to fix the extended keyboard to the electronic device.

13. The keyboard extending system according to claim 12, wherein the at least one fixing part is a bent arm extending from a side of the extended keyboard, or has suction structure to adhere the extended keyboard to the electronic device.

14. The keyboard extending system according to claim 11, wherein the plurality keys are conductive blocks and are respectively electrically connected to the corresponding conductive contact points via conductive lines.

15. The keyboard extending system according to claim 14, wherein the extended keyboard further comprises an insulating layer located between the keys and the conductive contact points, the keys are connected to the corresponding conductive contact points via conductive lines which are passed through the insulating layer.

16. The keyboard extending system according to claim 11, wherein the key comprises a conductive layer, a spacer layer, and a plurality of conductive pads, an amount of the conductive pads is equal to the amount of the conductive contact points connected to the key, and the conductive pads are connected to the conductive contact points one by one, the spacer layer is located between the conductive layer and the conductive pads; when the key is operated by the user, the spacer layer is depressed and the conductive layer is contacted with the conductive pads.

17. The keyboard extending system according to claim 11, wherein the a width of an area of the extended keyboard contacting with the multi-point touch screen is approximately equal to a width of an upper row of keys of the extended keyboard, and the conductive contact points are located below the upper row of keys of the extended keyboard.

18. The keyboard extending system according to claim 11, wherein the processing unit is further configured to determine an area surrounding the positions corresponding to all of the conductive contact points as the extended keyboard area when the electronic device enters the extended keyboard mode; the processing unit further configured to define an area of the multi-point touch screen excepting the extended keyboard area as a display area, and then adjust a display content previously displayed on the whole multi-point touch screen to only display on the defined display area.

19. The keyboard extending system according to claim 11, wherein the electronic device is one selected from a group consist of a mobile phone, a tablet computer, a notebook computer, and a digital photo frame.

\* \* \* \* \*